US011670085B2

(12) United States Patent
Verma et al.

(10) Patent No.: US 11,670,085 B2
(45) Date of Patent: Jun. 6, 2023

(54) PERSONALIZING VIDEOS WITH NONLINEAR PLAYBACK

(71) Applicant: Adobe Inc., San Jose, CA (US)

(72) Inventors: Gaurav Verma, Bangalore (IN); Balaji Vasan Srinivasan, Bangalore (IN); Trikay Nalamada, Hyderabad (IN); Pranav Goel, Pune (IN); Keerti Harpavat, Udaipur (IN); Aman Mishra, Indore (IN)

(73) Assignee: Adobe Inc., San Jose, CA (US)

( * ) Notice: Subject to any disclaimer, the term of this patent is extended or adjusted under 35 U.S.C. 154(b) by 29 days.

(21) Appl. No.: 17/090,013

(22) Filed: Nov. 5, 2020

(65) Prior Publication Data
US 2022/0138474 A1 May 5, 2022

(51) Int. Cl.
*G06V 20/40* (2022.01)
*G11B 27/34* (2006.01)
*G11B 27/034* (2006.01)

(52) U.S. Cl.
CPC .............. *G06V 20/47* (2022.01); *G06V 20/41* (2022.01); *G06V 20/49* (2022.01); *G11B 27/034* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 5,805,746 A * | 9/1998 | Miyatake ................ | G06F 16/78 348/642 |
| 8,296,797 B2 * | 10/2012 | Olstad .................... | G06F 3/0485 725/86 |
| 10,541,000 B1 * | 1/2020 | Karakotsios ..... | H04N 21/25891 |
| 2016/0014482 A1 * | 1/2016 | Chen .................. | H04N 21/8456 386/241 |
| 2016/0029105 A1 * | 1/2016 | Newman .............. | G11B 27/002 386/281 |
| 2016/0055885 A1 * | 2/2016 | Hodulik ................ | G06V 20/41 386/241 |
| 2016/0292511 A1 * | 10/2016 | Ayalasomayajula ........................ G06V 40/103 | |
| 2017/0351922 A1 * | 12/2017 | Campbell ............ | H04N 19/179 |
| 2018/0032305 A1 * | 2/2018 | Cameron .............. | G06F 40/169 |
| 2018/0068019 A1 * | 3/2018 | Novikoff ................ | G06F 16/58 |
| 2020/0154060 A1 * | 5/2020 | Kovshov ............... | H04N 5/262 |
| 2020/0159759 A1 * | 5/2020 | Younessian ............. | G06F 16/41 |

(Continued)

OTHER PUBLICATIONS

Handley, Ann, and Charles C. Chapman. Content rules: How to create killer blogs, podcasts, videos, ebooks, webinars (and more) that engage customers and ignite your business. vol. 5. John Wiley & Sons, 2010., 2010.

(Continued)

*Primary Examiner* — Gelek W Topgyal
(74) *Attorney, Agent, or Firm* — Keller Preece PLLC

(57) ABSTRACT

A method for personalized playback of a video as performed by a video platform includes parsing a video into segments based on visual and audio content of the video. The platform creates multimodal fragments that represent underlying segments of the video, and then orders the multimodal fragments based on a preference of a target user. The platform thus enables nonlinear playback of the segmented video in accordance with the multimodal fragments.

20 Claims, 13 Drawing Sheets

(56) References Cited

U.S. PATENT DOCUMENTS

2020/0195983 A1* 6/2020 Chao .................. G06F 16/7328
2021/0248173 A1* 8/2021 Hansen .................. H04L 65/60

OTHER PUBLICATIONS

Abdi, Hervé. "Coefficient of variation." Encyclopedia of research design 1 (2010): 169-171., 2010.
Hsieh, Jung-Kuei, Yi-Ching Hsieh, and Yu-Chien Tang. "Exploring the disseminating behaviors of eWOM marketing: persuasion in online video." Electronic Commerce Research 12.2 (2012): 201-224., 2012.
He, K., Zhang, X., Ren, S., & Sun, J. (2016). Deep residual learning for image recognition. In Proceedings of the IEEE conference on computer vision and pattern recognition (pp. 770-778)., 2016.
Szegedy, C., Vanhoucke, V., Ioffe, S., Shlens, J., & Wojna, Z. (2016). Rethinking the inception architecture for computer vision. In Proceedings of the IEEE conference on computer vision and pattern recognition (pp. 2818-2826)., 2016.
Faghri, F., Fleet, D. J., Kiros, J. R., & Fidler, S. (2017). Vse++: Improving visual-semantic embeddings with hard negatives. arXiv preprint arXiv:1707.05612., 2017.
Gu, H., & Swaminathan, V. (Jul. 2018). From thumbnails to summaries—a single deep neural network to rule them all. In 2018 IEEE International Conference on Multimedia and Expo (ICME) (pp. 1-6). IEEE., 2018.
Kim, T., Heo, M. O., Son, S., Park, K. W., & Zhang, B. T. (2018). Glac net: Glocal attention cascading networks for multi-image cued story generation. arXiv preprint arXiv:1805.10973., 2018.
Mahapatra, D., Mariappan, R., Rajan, V., Yadav, K., & Roy, S. (Apr. 2018). VideoKen: Automatic Video Summarization and Course Curation to Support Learning. In Companion Proceedings of the The Web Conference 2018 (pp. 239-242)., 2018.
Zhou, K., Qiao, Y., & Xiang, T. (Apr. 2018). Deep reinforcement learning for unsupervised video summarization with diversity-representativeness reward. In Thirty-Second AAAI Conference on Artificial Intelligence., 2018.
Chen, Y., Tao, L., Wang, X., & Yamasaki, T. (2019). Weakly supervised video summarization by hierarchical reinforcement learning. In Proceedings of the ACM Multimedia Asia (pp. 1-6)., 2019.
Miller, D. (2019). Leveraging BERT for extractive text summarization on lectures. arXiv preprint arXiv:1906.04165., 2019.
Reimers, N., & Gurevych, I. (2019). Sentence-bert: Sentence embeddings using Siamese bert-networks. arXiv preprint arXiv:1908.10084., 2019.
Sherner, Y., Rotman, D., & Shimkin, N. (2019). ILS-SUMM: Iterated Local Search for Unsupervised Video Summarization. arXiv preprint arXiv:1912.03650., 2019.
Wolf, T., Debut, L., Sanh, V., Chaumond, J., Delangue, C., Moi, A., . . . & Brew, J. (2019). HuggingFace's Transformers: State-of-the-art Natural Language Processing. ArXiv, arXiv-1910., 2019.
Vladimir Iashin and Esa Rahtu, A Better Use of Audio-Visual Cues: Dense Video Captioning with Bi-modal Transformer, arXiv:2005.08271, May 2020, 2020.
Google is Reportedly Adding Timestamps to YouTube Videos in Search Results; https://www.searchenginejournal.com/google-is-reportedly-adding-timestamps-toyoutube-videos-in-search-results/312839/#close (retrieved from the Internet Feb. 5, 2021), 2021.
Google Speech to Text API: https://cloud.google.com/speech-to-text/docs/, Retrieved from the Internet Feb. 5, 2021., 2021.
"Automatic Understanding of Image and Video Advertisements", Zaeem Hussain, Mingda Zhang, Xiaozhong Zhang, Keren Ye, Christopher Thomas, Zuha Agha, Nathan Ong, Adriana Kovashka. To appear, Proceedings of the IEEE Conference on Computer Vision and Pattern Recognition (CVPR), Jul. 2017., 2017.

\* cited by examiner

Carousel Of Fragments

Table of Contents

PERSONALIZING VIDEOS WITH NONLINEAR PLAYBACK

TECHNICAL FIELD

The disclosed teachings relate to video processing for personalized playback.

BACKGROUND

An online video platform provided by a video hosting service enables users to upload, convert, store and play back video content, often via a structured, large-scale system that may generate revenue. Users generally will upload video content via the hosting service's website, mobile or desktop application, or other interfaces. The type of video content uploaded might be anything from shorts to full-length shows and movies or original works. The video host stores the video on a server and offers users the ability to enable different embedded codes or links that allow others to view the video content. The website, mainly used as the video hosting website, is usually called the video sharing website.

Due to advances in web technologies and the popularity of video sharing platforms, the amount of available video data is dramatically increasing. To facilitate video consumption, video summarization is used to generate a short summary of the content of a longer video by selecting and presenting video segments for users. The summary is usually composed of video clips extracted from the original video with some editing process. The aim of video summarization is to speed up browsing and achieve efficient access and representation of the video content. By reviewing the summary, users can make quick decisions on the usefulness of the video.

Generally, video summarization relates to the process of breaking video content into a succinct quick-to-process form. One technique uses an iterative local search optimization framework to perform unsupervised video summarization. Another technique uses deep reinforcement learning and a deep summarization network to perform summarization. Yet another technique uses a hierarchical reinforcement learning framework with a worker-manager model to perform the summarization. However, these techniques lack practical personalization mechanisms that would enable rapid consumption.

SUMMARY

The disclosed techniques include a method performed by a computing system to break a video into coherent units (e.g., segments) that account for visual and audio content. The system generates multimodal (image-text) fragments that each represent an underlying video segment. The method can tailor generation of the multimodal fragment to the preferences of a target user. The multimodal fragments can be ranked and/or reordered across various segments to further tailor playback to reflect the preferences of the target user. As such, this end-to-end technique enables video consumption in a nonlinear manner by breaking the video into summarized fragments, which can be consumed independently, breaking the video into representative multimodal fragments that can function as a table of contents (e.g., an index for the video), and/or re-ordering the multimodal fragments for playback of the segments in a nonlinear way relative to a timeline of the video.

BRIEF DESCRIPTION OF THE DRAWINGS

Embodiments of the present technology will be described and explained through the use of the accompanying drawings.

Figure 1:
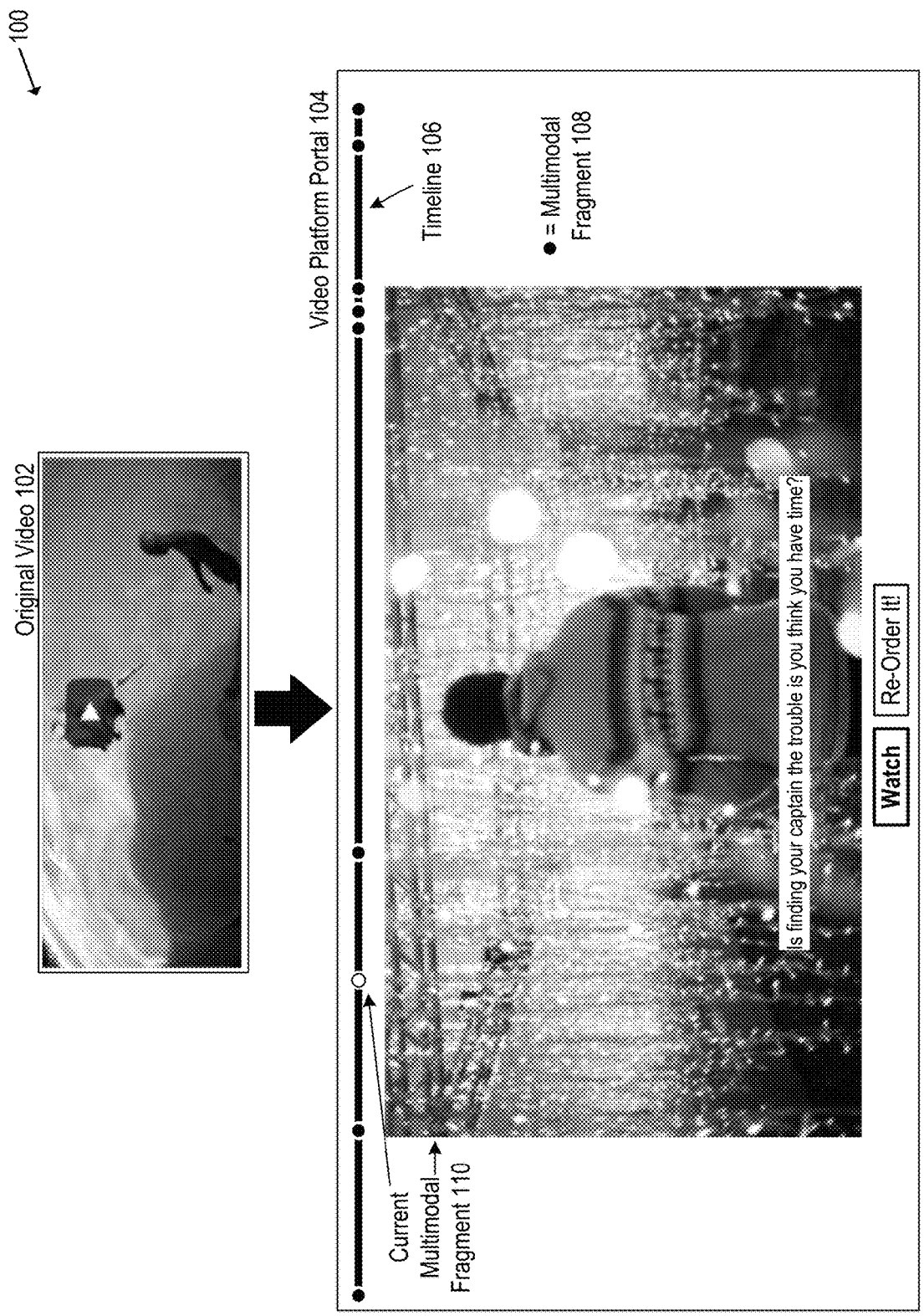
FIG. 1 depicts an index of multimodal fragments for nonlinear playback of video segments relative to a timeline of the video.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Introduced here is at least one technique for generating an index that enables nonlinear playback of segments of a video relative to a timeline of the video. The video segments are represented as multimodal fragments for the index. The multimodal fragments are generated based on preferences of a target user. Further, the multimodal fragments of corresponding video segments are ranked and/or ordered in accordance with the target user's preferences. Accordingly, video playback (e.g., playback order of video segments) is personalized for the target user.

The technique addresses problems that arise in today's digital world of rapidly increasing video content creation. Numerous videos are published online, and some have drawn attention as effective and engaging communications. Videos have become crucial for delivering information as an experience for users of a video platform. In general, videos are sequential in terms of delivery to users and playback. Hence, videos are often part of a larger category of content that is referred to as "linear content," which has a distinct beginning and end with a logical flow having a starting point through to a conclusion.

The sheer number of videos available on video platforms presents a need for a mechanism that enables rapid consumption. Further, due to a user's time constraints and the technical limitations of, for example, network bandwidth to play back videos on a device, a user might not want to consume an entire video. Moreover, due to different interests among users, one consumer might be interested in portions of a video and willing to skip the rest. A known solution for rapid consumption of videos includes summarizations; however, different consumers have different tastes and preferences such that summarizations risk omitting aspects of videos that are of interest to some users. Moreover, summarizations only offer linear playback of videos. That is, video playback only progresses in accordance with a timeline (e.g., no preference-based, non-linear consumption).

For example, YouTube® provides a menu analogous to a table-of-contents that indexes sections of video. The table of contents are only text-based. This feature requires that a user provide segmentation information in descriptions, which are then used to generate the index. In another example, VideoKEN™, an artificial intelligence (AI) player for videos, performs a topical decomposition of a video and allows users to browse the video according to recognized topics.

However, existing video platforms do not personalize videos based on the preferences of users and cannot be processed independently to get a quick summary of the underlying video for a target user. Further, existing systems do not generate a sequence of multimodal fragments as representations that point to video segments. Further, existing summarization techniques do not consider the preferences of target users while performing summarization and thus do not personalize resulting summaries. Moreover, existing video platforms only present summaries in the order that matches a timeline of a source video. In other words, delivery or playback is only linear.

The disclosed techniques improve over existing solutions to enable rapid, efficient, and nonlinear playback of a video based on the preferences of a target user. Specifically, embodiments overcome shortcomings of existing video platforms by addressing the inability to consume entire videos due to their duration and bandwidth and storage space constraints; the inability to efficiently navigate through a video without a table of contents; and summarizations of videos that are generic and do not appeal to each user. One way that the embodiments address these shortcomings is by segmenting a video into coherent logical segments that are independently consumable. A lengthy video broken down into segments is consumed in different orders based on preferences of different target users. Thus, the disclosed solution grants more flexible playback for users and enables playback of a given video based on the preferences of a user.

FIG. 1 depicts a high-level conversion 100 of a video into multimodal fragments for nonlinear playback of the video. As shown, a video platform breaks down an original video 102 into segments and generates corresponding multimodal fragments that include an image and associated text. The video platform portal 104 presents a timeline 106 with multimodal fragments 108 represented by filled circles in the timeline 106. The current multimodal fragment 110 is represented by an unfilled circle in the timeline 106, and includes an image and associated text "Is finding your captain the trouble is you think you have time?" The original video 102 is played back in a nonlinear manner by skipping to multimodal fragments in an order that is personalized for a target user.

Figure 2A:
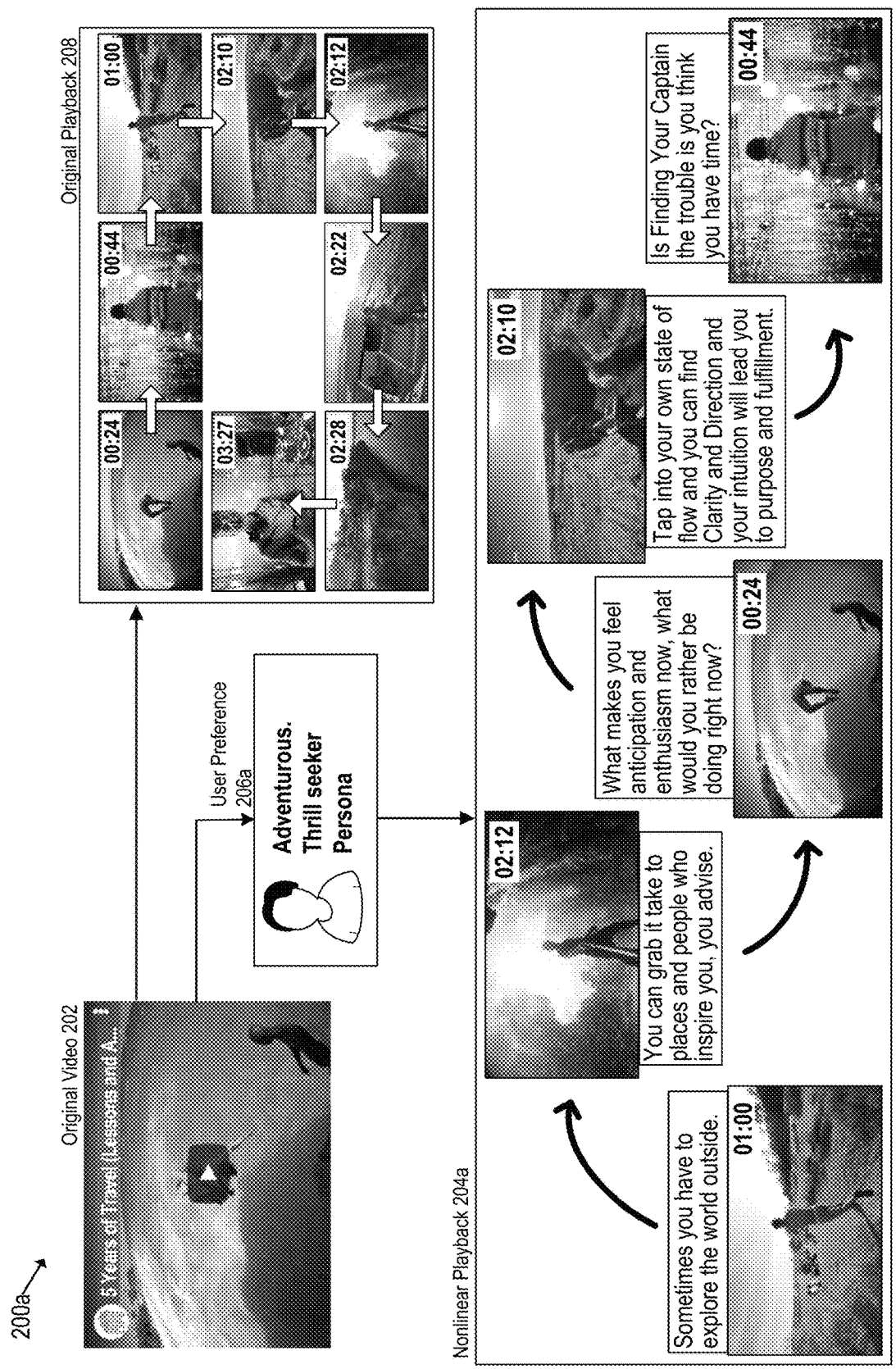
FIG. 2A depicts an example for converting a video into multimodal fragments for nonlinear playback that depends on a preference of a target user.
Figure 2B:
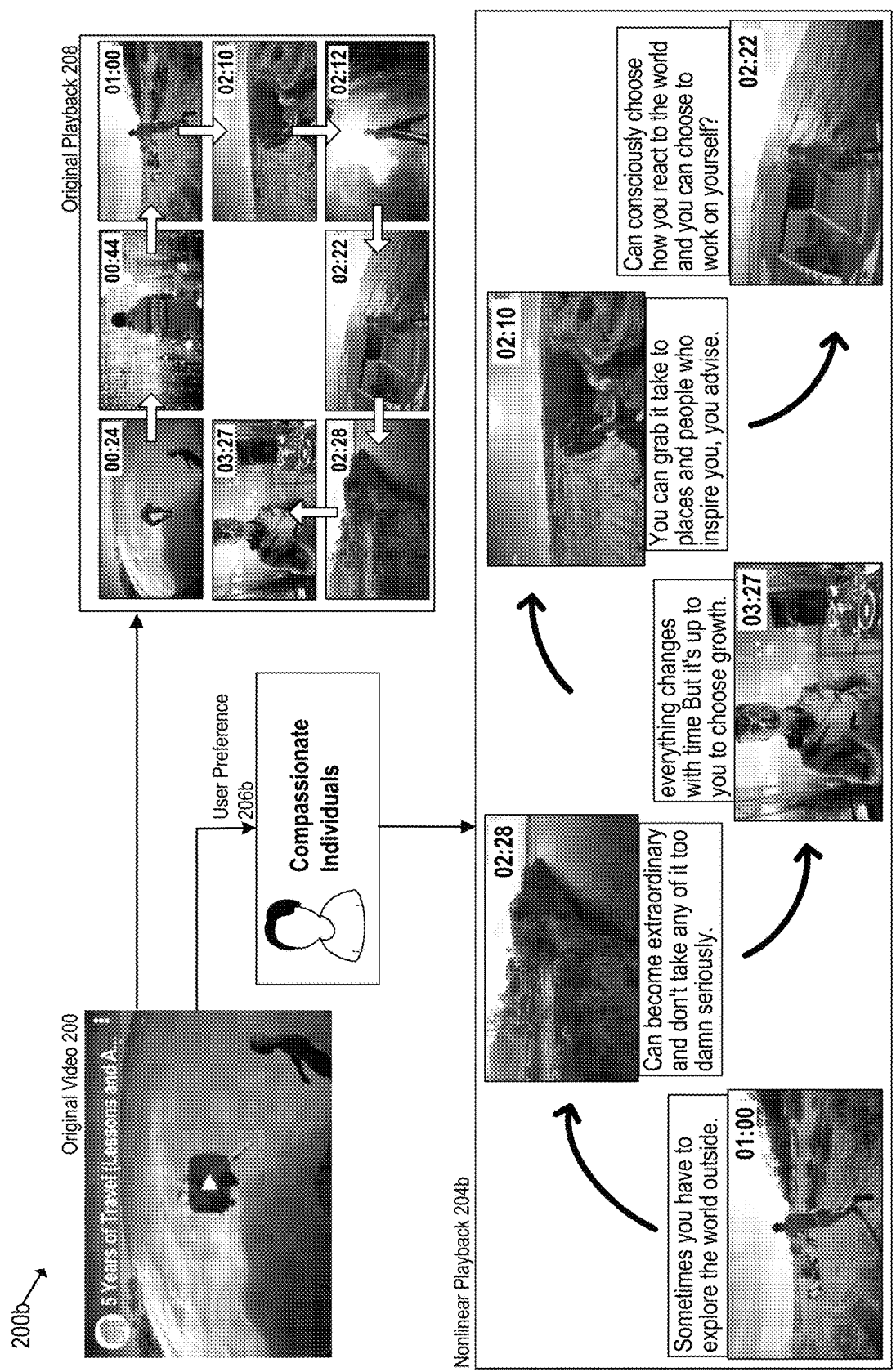
FIG. 2B depicts an example for converting the video of FIG. 2A into multimodal fragments for different nonlinear playback that depends on a preference of a target user different from the preference of the target user of FIG. 2A.

The video platform includes one or more modules (e.g., software and/or hardware components) that generate the multimodal fragments for personalized nonlinear playback of a video. For example, for each segment, one or more algorithm(s) generate a multimodal fragment that is tailored for the preferences of the target user. Each multimodal fragment includes an image-text pair that summarizes information of an underlying video segment for a target user. The multimodal fragments form an index for corresponding parts of a video, thereby serving as a "table of contents." In one implementation, the algorithm(s) rank multimodal fragments and orders playback to suit preferences of a target user. As such, the multimodal fragments are ordered based on their relevance to the user for nonlinear playback that is personalized for the user FIGS. 2A and 2B illustrate specific examples of converting the same video into multimodal fragments for different nonlinear arrangements depending on different user preferences. As shown, modules determine an order for the multimodal fragments depending on a target user's preferences. The shown timestamps denote a point in time relative to a timeline of original video 202. Specifically, FIG. 2A depicts conversion 200a of the original video 202 based on a user preference 206a corresponding to an "adventurous" persona type. At least a portion of the original video 202 is consumed in accordance with the nonlinear playback 204a. FIG. 2B depicts a different conversion 200b of the same original video 202 based on a different user preference 206b corresponding to a "compassionate" persona type. At least a portion of the original video 202 is consumed in accordance with the nonlinear playback 204b. For reference, the order of the original playback 208 is shown in the top-right of each figure.

For the "adventurous" persona type of FIG. 2A, the multimodal fragments of the original video 202 reflect an adventurous preference of a persona chosen for a target user. For each multimodal fragment, each image is accompanied with descriptive text that likewise reflects the adventurous preferences of the user. For example, the texts an imagery of the multimodal fragments are highly aligned toward hues associated with adventurous behavior. The nonlinear playback 204a has a multimodal fragment including a keyframe image of a man eager to jump into a waterbody. The text "Sometimes you have to explore the world outside" is associated with the image, which corresponds to a segment of the original video 202 at time 01:00. The next image at time 02:12 has the man under a waterfall, the following image at time 00:24 has the man backflipping off a cliff, and so on. Each of these images correspond to different multimodal fragments that are associated with descriptive text.

In FIG. 2B, the multimodal fragments are arranged for a "compassionate" persona type with images and accompanying text that reflect a higher degree of compassion compared to the adventurous persona type. The nonlinear playback 204a and nonlinear playback 204b have some common multimodal fragments and some different multimodal fragments, arranged in different non-linear orders. In one example, the multimodal fragments are presented as a carousel that can be skimmed through or linked to the corresponding segments of the original video 202 thereby serving as an index (e.g., table of contents) for the original video 202.

In another example, for a given video, a nonlinear output is tuned for a "happy" persona, to show multimodal fragments of a joyful nature including an image accompanied with words such as "beautiful," which convey happiness. A next multimodal fragment includes an image with a man smiling while playing a guitar, a subsequent image shows another man smiling, and so on. Here, again, the order is not the order in which these fragments appear in an original video but re-ordered to suit the needs of the happy persona. In contrast, a different set and/or order of multimodal fragments are generated for an "adventurous" persona. For example, a first multimodal fragment includes an image of a couple that just finished trekking, a next image includes the couple hiking on a snow-capped mountain, a subsequent image includes images of the man standing atop a hill after finishing a trek, and so on. The sentences that accompany the images are also aligned toward active behavior.

Network Environment

Figure 3:
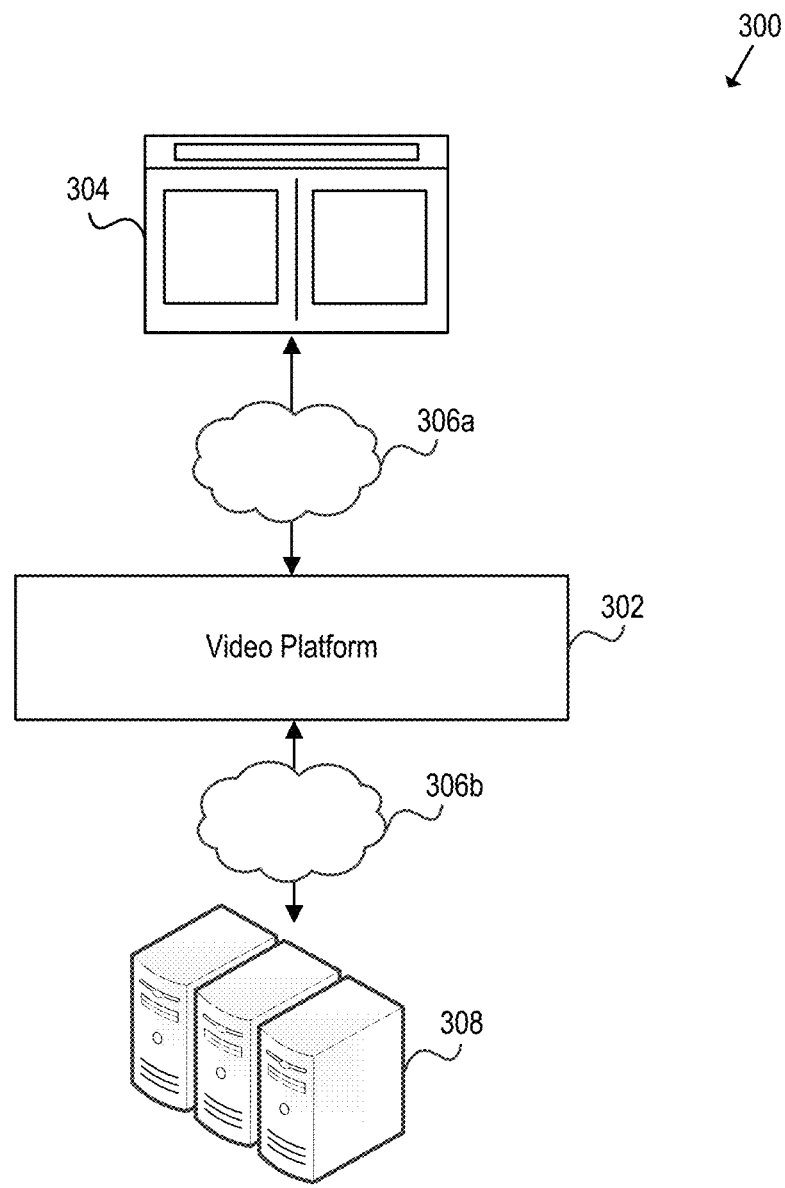
FIG. 3 illustrates a network environment that includes a video platform to perform video processing for nonlinear playback of a video in accordance with preferences of a target user.

FIG. 3 illustrates a network environment 300 that includes a video platform 302 to perform online video processing for nonlinear playback of a video in accordance with preferences of a target user. Individuals can interface with the video platform 302 via an interface 304. The video platform 302 can be embodied in a computing device. The video platform 302 receives videos as input and generates multimodal fragments that are ordered for personal preferences. A user can access the video platform 302 and then submit, via an interface of the video platform 302, a query for personalized videos from a database.

In some embodiments, the video platform 302 may reside in a network environment 300. Thus, the video platform 302 may be connected to one or more networks 306a-b. The network(s) 306a-b can include personal area networks (PANs), local area networks (LANs), wide area networks (WANs), metropolitan area networks (MANs), cellular networks, the Internet, etc. Additionally or alternatively, the video platform 302 can be communicatively coupled to computing device(s) over a short-range communication protocol, such as Bluetooth® or near-field communication (NFC).

The interface 304 is preferably accessible via a web browser, desktop application, mobile application, and/or over-the-top (OTT) application. Accordingly, the interface 304 may be viewed on a personal computer, tablet computer, mobile phone, game console, music player, wearable electronic device (e.g., a watch or a fitness accessory), network-connected ("smart") electronic device (e.g., a television or a home assistant device), virtual/augmented reality system (e.g., a head-mounted display), or some other electronic device.

Some features of the video platform 302 can be hosted locally. That is, the video platform 302 may reside on the computing device used to access the interface 304. For example, the video platform 302 may be embodied as a desktop application executing on a personal computer. Other embodiments of the video platform 302 are executed by a cloud computing service operated by Amazon Web Services® (AWS), Google Cloud Platform™, Microsoft Azure®, or a similar technology. In such embodiments, the video platform 302 may reside on a host computer server that is communicatively coupled to one or more content computer servers 308. The content computer server(s) 308 can include different types of data (e.g., images, query logs), user information (e.g., profiles and credentials), and other assets. Such information could also be stored on the host computer server.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., graphics, matching algorithms, and processing operations) to be downloaded at a single point in time or on a periodic basis (e.g., weekly, daily, or hourly).

Personalization Modules

Figure 4A:
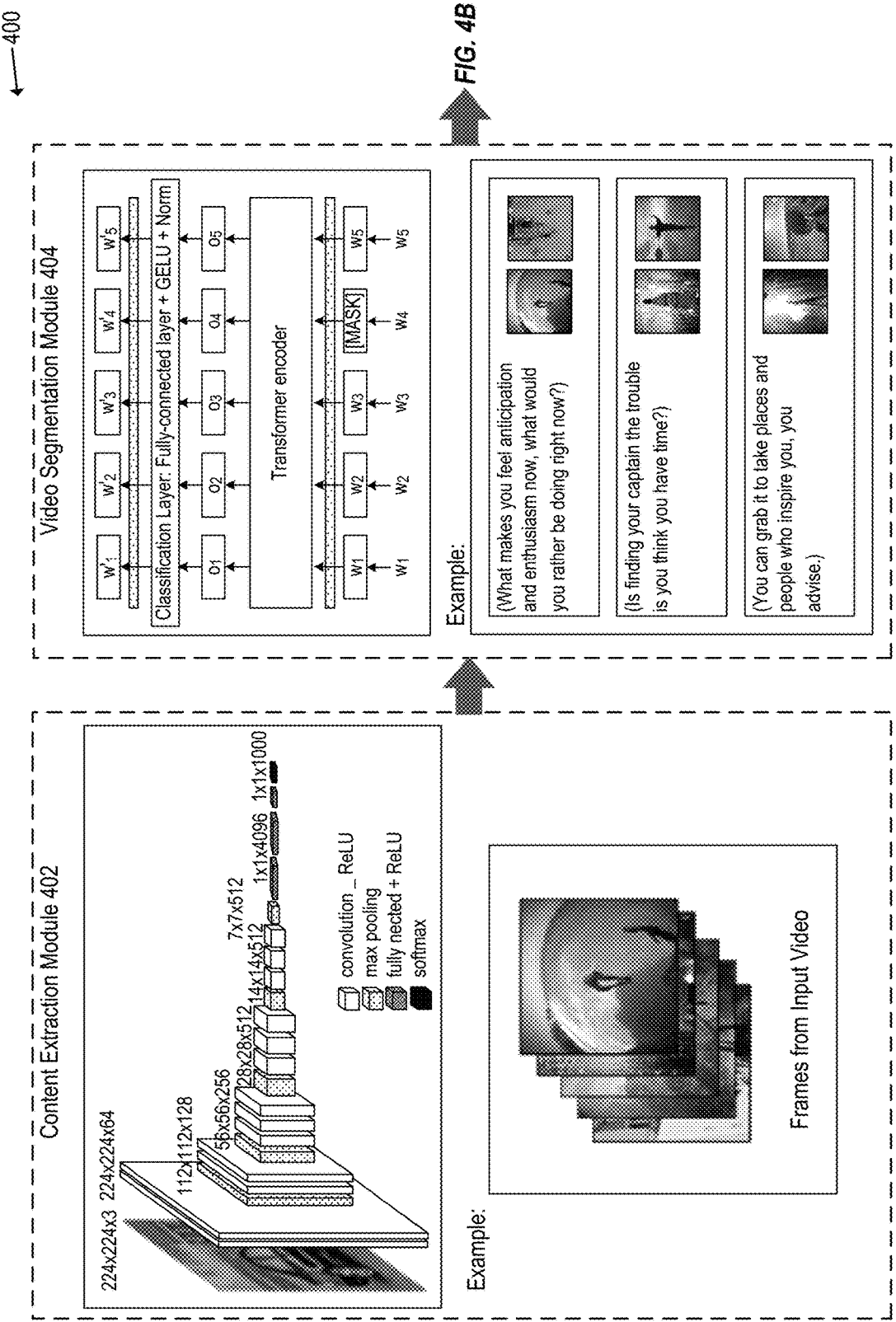
FIGS. 4A through 4C include a block diagram that illustrates modules of a video platform that process a video to generate nonlinear playback based on preferences of a target user.
Figure 4B:
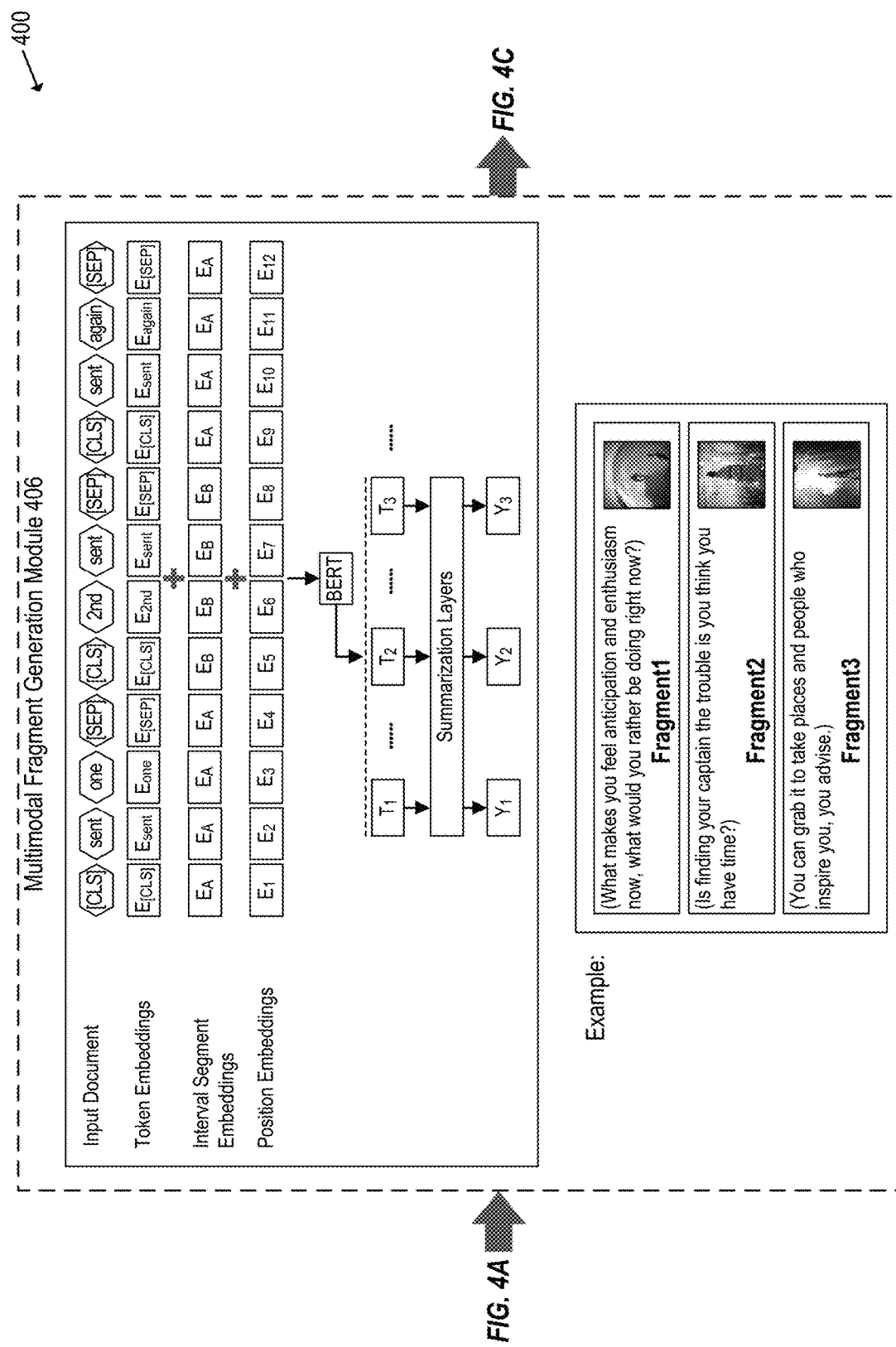
Figure 4C:
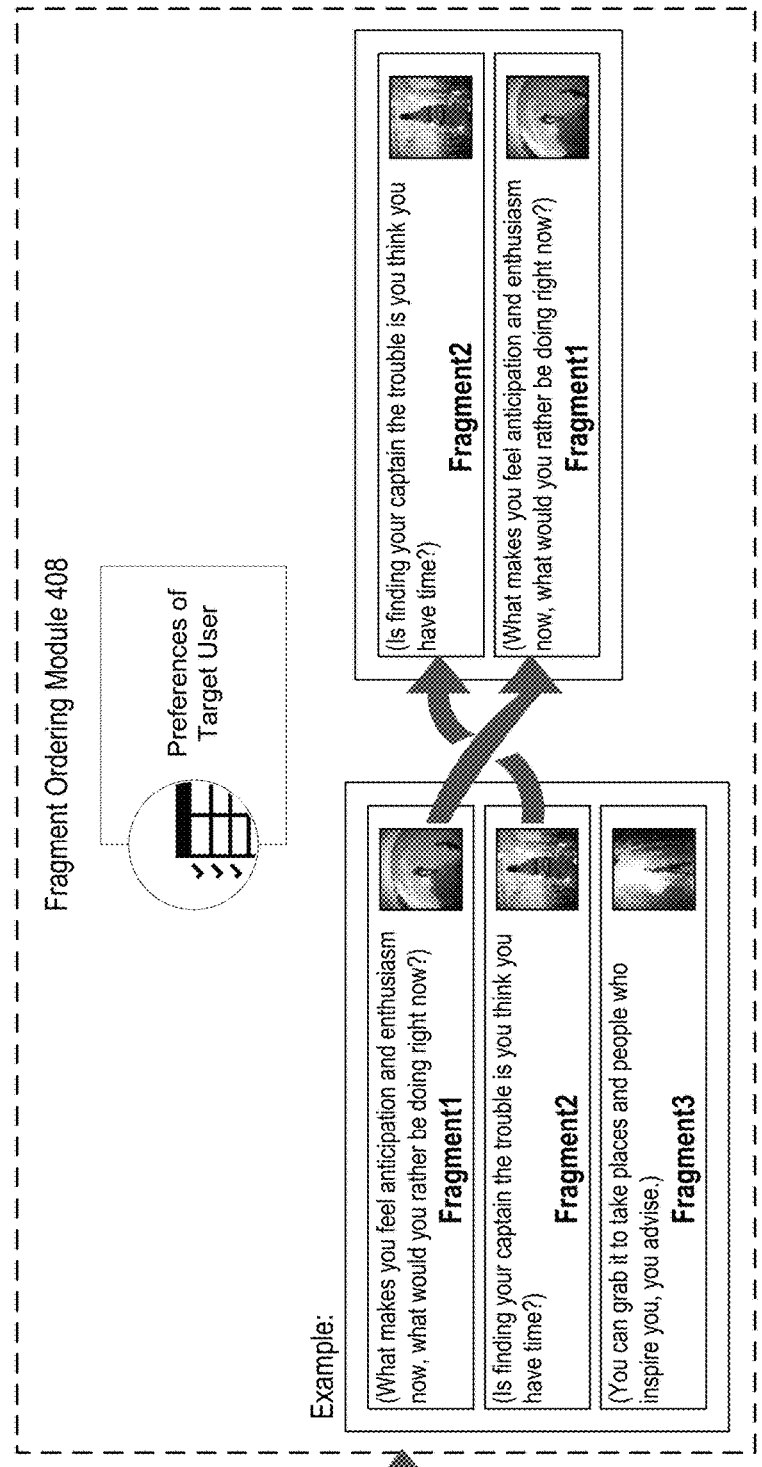

FIGS. 4A through 4C illustrate a block diagram including modules of a video platform that perform a process 400 to generate nonlinear playback of a video based on preferences of a target user. The modules include a content extraction module 402, a video segmentation module 404, a multimodal fragment generation module 406, and a personalized ordering module 408. In one example, the modules 402 through 408 include or correspond to distinct but interrelated and/or independent units of hardware and/or software for a program that performs the process 400. In another example, the modules 402 through 408 represent components including functions or operations of one program module that performs the entire process 400. In brief, the process 400 extracts information of a video, segments the video into coherent units (e.g., segments), generates a multimodal fragment for each segment, and ranks and/or orders the multimodal fragments based on preferences of target users such that playback of the video segments is nonlinear relative to an original timeline of the video.

An implementation of a module includes software and/or hardware such as one or more processors and one or more memories storing instructions that, when executed by the processor(s) can cause the video platform to perform functions of the module. In some embodiments, a single storage module includes multiple computer programs for performing different functions, while in other embodiments, each computer program is hosted within a separate storage module. Embodiments of the video platform may include some or all of these components as well as other components not shown or described herein for the sake of brevity.

The video platform can reside on a server system that includes one or more network-accessible computer servers (see, e.g., FIG. 3). In such embodiments, a communication module can communicate with a software program executing on a user computing device to, for example, generate multimodal fragments stored at the user computing device. Those skilled in the art will recognize that the components of the video platform can be distributed between the server system and the computing device associated with a user in various manners. For example, some data may reside at the computing device of a user device, while other data may reside at the server system.

The video platform manages a processing pipeline that converts a linear video into a set of alternative multimodal fragments, that are ordered to suit preferences of target users. Specifically, a video is received as input along with preference information of users to generate coherent multimodal units that collectively encompass the entire content or a portion of the content of the video. The units are represented by respective multimodal fragments, each including an image-text pair, and ordered in accordance with a user's preferences, without compromising the coherence of the multimodal fragments.

An embodiment of the video platform includes consumer-facing features that expand the capabilities of existing video platforms. For example, Behance™ is a social media platform by Adobe to discover and showcase creative works. Behance Live allows creative professionals to share their experience in tutorial-like videos on different creative applications. The videos often span tens of minutes in duration. The video platform allows a nonlinear consumption of the videos and provides control to a user to access videos and segments in specific areas of interest. In another example, Adobe Experience Manager (AEM) can enable a user to manually create different variant-of-experience fragments, which thus impedes scalability and personalization. The disclosed techniques can improve scaling to reliably create multimodal fragments for various videos and different user preferences. In an enterprise repository, the disclosed technique provides a good entry point to such dynamic content of a website. In another implementation, teasers are created for an article/webpage and the disclosed technology extends teaser generation to videos in a website.

Content Extraction Module

The process 400 begins by extracting visual and textual information of a video. The content extraction module 402 processes the video to extract keyframes, an audio transcript, sentiment features, and/or contextual features. In particular, the content extraction module 402 extracts semantic information and forms logical segments for the video. As shown, the illustrated diagram represents a Resnet-152 architecture that is used to extract the example frame representation.

Figure 5:
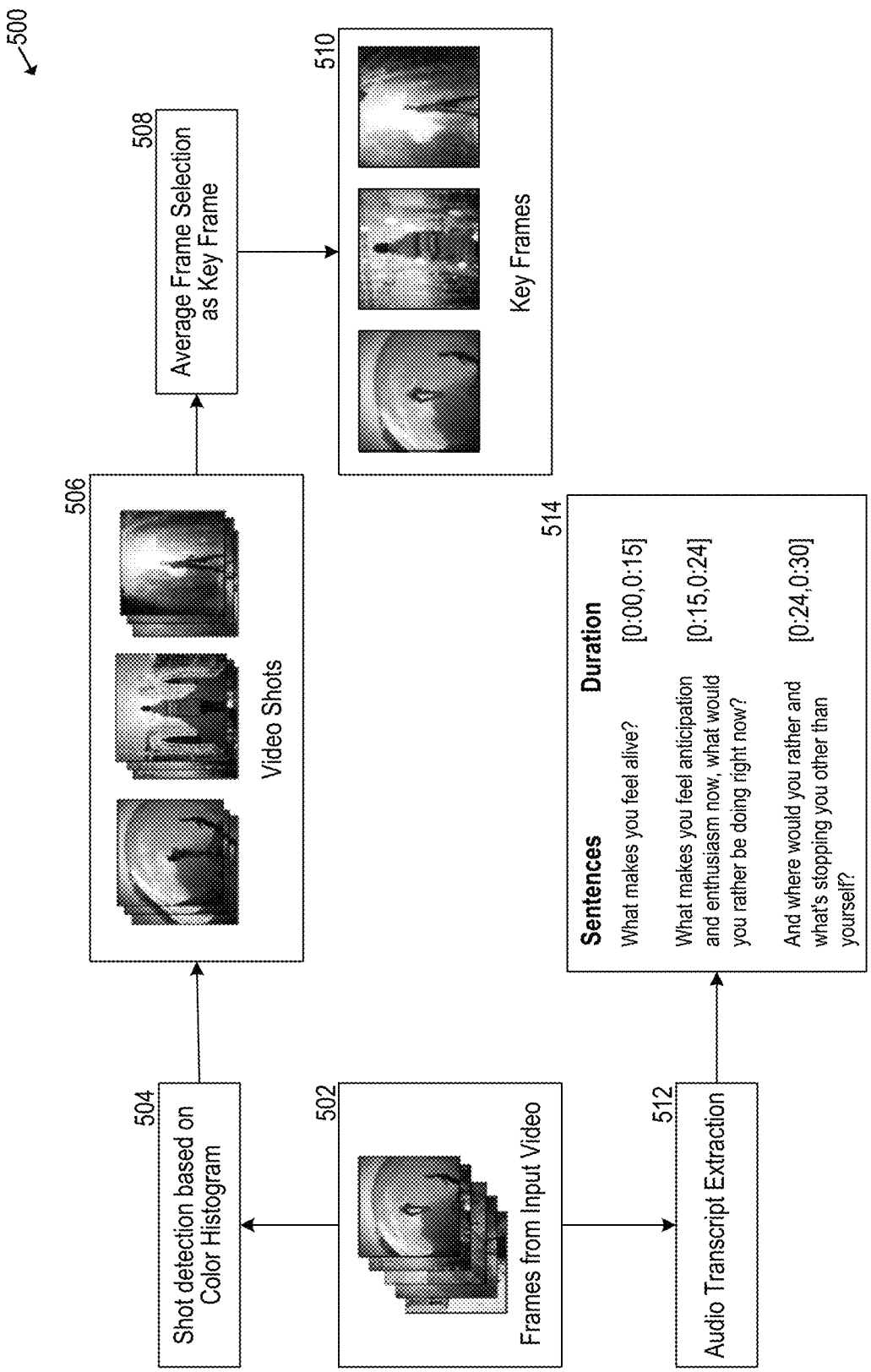
FIG. 5 is a flowchart that illustrates a process to extract visual and audio content of a video.

FIG. 5 is a flowchart that illustrates a process 500 to extract visual and textual information from a video. At 502, the video platform receives a video as input, including visual and audio content. At 504, the content extraction module 402 extracts a color histogram of every frame in the video to detect a video shot. A video "shot," as used herein, can refer to a short spurt of video frames that are temporally close in visual space. This process is used to obtain a set of video shots of the video. The content extraction module 402 makes a new video shot based on a difference between color histograms of adjacent frames. Specifically, the content extraction module 402 computes a delta between a pair of adjacent frames. If the difference between two adjacent frames is greater than a threshold $s_1$, then the i+1th frame is marked as the start of a new shot. For example, $s_1$ can be defined as:

$$s_1 = 6 \times \frac{1}{N} \sum_{i=1}^{N-1} \sum_j |bar_j^{i+1} - bar_j^i|$$

Here, the threshold is six times the mean delta between successive frames of the video. This allows for video shots to be adaptive to visual variations in the video. At 506, the video shots of the video are obtained. At 508, once shots are obtained, a median frame is selected from the video shot as a keyframe for that shot. At 510, the video shots are used to break the video into coherent units (e.g., segments).

Regarding textual information, at 512 audio transcripts are simultaneously extracted from the video by using automatic speech recognition to break the audio transcript into sentences along with identifying the start and end times of the sentences as shown at 514. The sentences are grouped based on their semantic similarity in a BERT embedding space. The sentence embeddings are extracted for every sentence using a pretrained BERT model. For each group of sentences, a keyframe is assigned to video shots that the group spans, which results in a set of coherent video units.

Persona Modeling

The content extraction model 402 models a target persona for a user by using a corpus of advertisement videos as a training dataset, which contain annotations for visual sentiments of a video. The training dataset includes overlapping sentiment dimensions. In operation, visual embeddings are extracted from every frame (X) of a video by using SoTA image representations (Resnet-152) and building a frame-level sentiment classifier, (Z=f(X)) to model different target sentiments.

At inference time (e.g., after being trained for visual sentiments), an inferred vector is averaged over an entire video to obtain a distribution of different sentiments indicated in the video. This video-level, as well as frame-level, sentiment distribution is used for identifying which segments of a video are more desirable by users with certain attributes. For capturing user attributes, the information extraction model 402 aggregates the sentiment distribution across different videos that were consumed by a user. This is treated as user preferences in an implementation. The same classifier is used to extract a sentiment distribution for every video shot extracted from the video to be used to compute a segment-level alignment score for a given persona.

Video Segmentation Module

The video segmentation module 404 performs sematic video segmentation, which involves BERT embeddings, cosine similarity, and placing frames into groups. As shown, the illustrated diagram includes a BERT architecture that used to extract example BERT embeddings.

Figure 6:
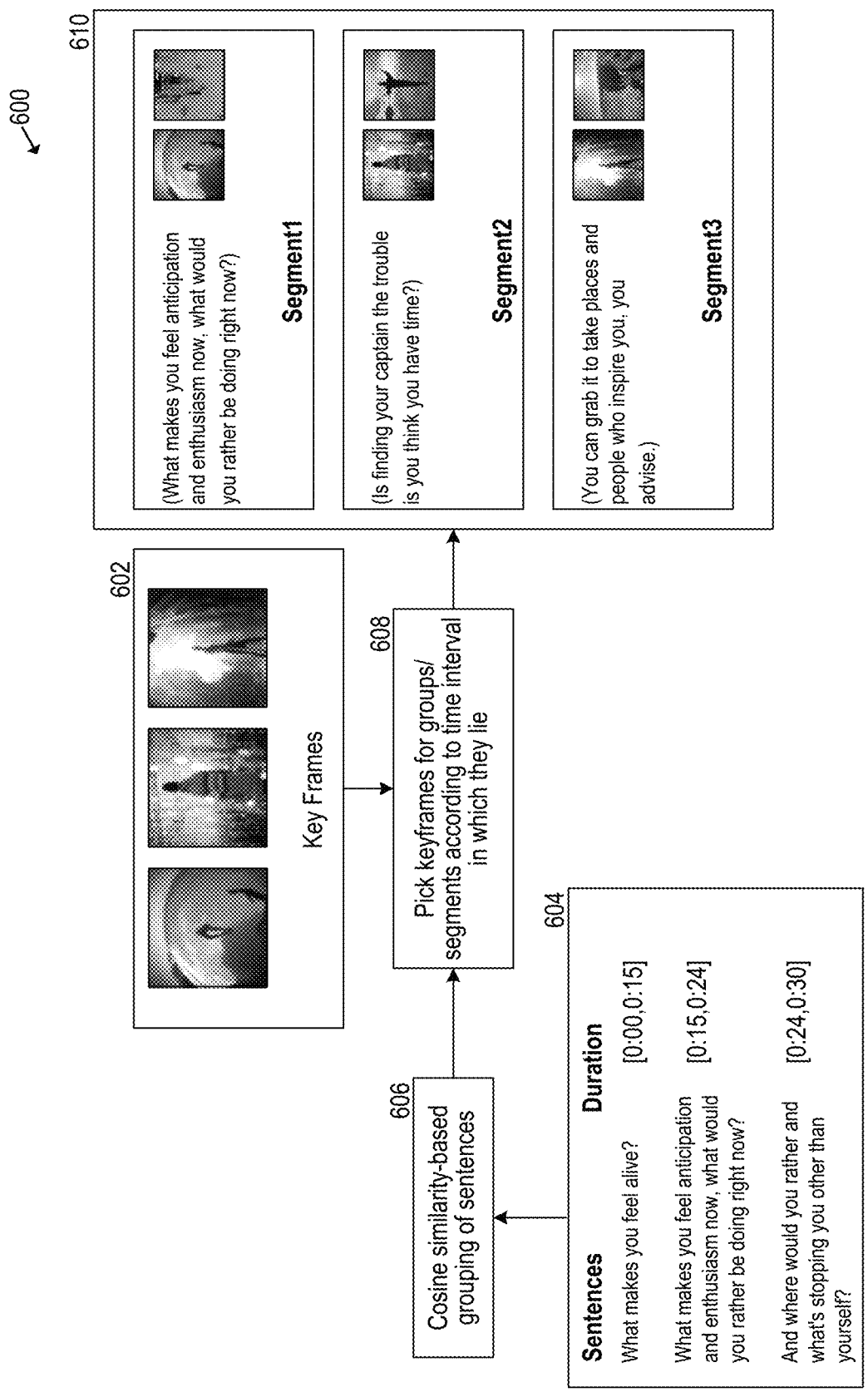
FIG. 6 is a flowchart that illustrates a process for segmenting a video into coherent units.

FIG. 6 is a flowchart that illustrates a process 600 for segmenting a video into coherent units. The information output by the content extraction module 402 includes the keyframes 602 (e.g., keyframes 410) and sentences and durations 604 (e.g., sentences and durations 414). This information is used to segment the video into the coherent units. The set of sentences of the transcript are grouped. At 606, the video segmentation module 404 maintains a running average of the embedding vector of the current sentence group and decides whether to add an additional sentence into a group based on the cosine similarity of an additional sentence and a running average vector. If this value is greater than a threshold ($s_2$), video segmentation module 404 inserts it into the existing group, otherwise the sentence is marked as a start of a new group. The same procedure is followed for all sentences in the transcript. Once sentence groups are obtained, at 608 the platform picks keyframes for the groups/segments according to time intervals in which they occur. That is, the platform collates all keyframes (and video shots) in the timeframe spanned by the sentences in a group and adds them into a corresponding video segment. At 610, the video platform uses coherence in the textual modality to identify coherent segments in the videos.

Multimodal Fragment Generation Module

In FIG. 4B, the multimodal fragment generation module 406 receives as input the output of the video segmentation module 404. A representative multimodal fragment is generated for each extracted segment by picking a representative frame using a semantic importance scoring system which accounts for a frame's relevance to the video and its alignment to user preferences. The audio transcripts of a segment are summarized into a representative text fragment of the multimodal fragment. This yields a multimodal fragment including an image plus text for every video segment.

As shown, the illustrated diagram includes a BERT summarization architecture that takes a sequence of text separated at the sentence-level and incorporates both token and positional embeddings to arrive at a representation T for every sentence. The architecture infers a variable Y to indicate whether a sentence needs to be part of a particular summary.

Figure 7:
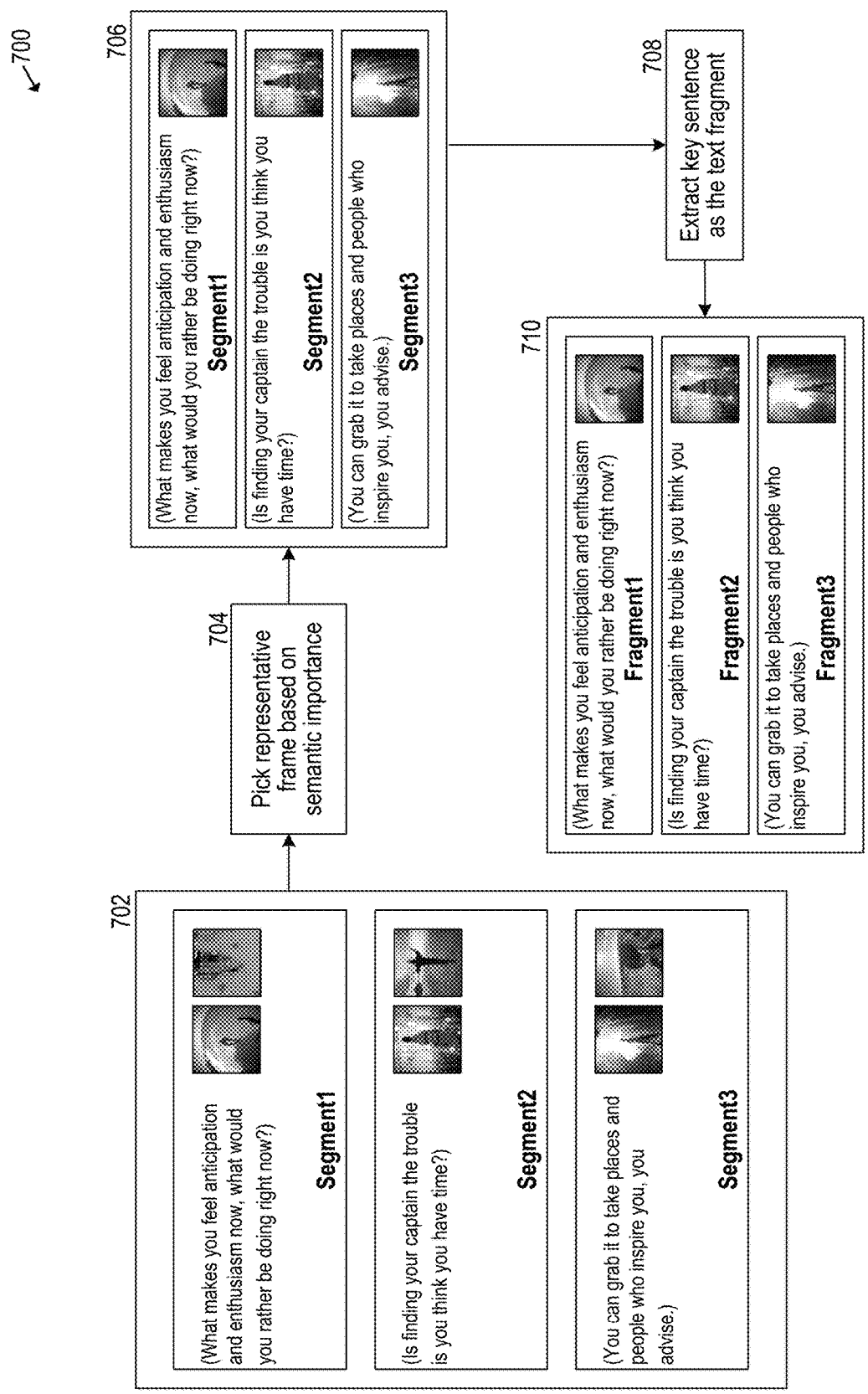
FIG. 7 is a flowchart that illustrates a process for generating a multimodal fragment for a video segment in accordance with a preference of a target user.

FIG. 7 is a flowchart that illustrates a process for generating a multimodal fragment for a video segment in accordance with a preference of a target user. Once the video is segmented at 702 (e.g., coherent segments 610), the video platform generates a representative multimodal fragment (image plus text) that "summarizes" the underlying segment, while also aligning the segment to a persona of the target user.

For the image component of the multimodal fragment, a scoring system scores each frame in the segment based on one or more of the following factors:

A similarity to a user preference (prefScore): the platform computes a sentiment distribution score described earlier for every frame and computes its cosine similarity to the current user's sentiment distribution.

Relevance to the video context (relScore): the platform uses a pretrained BiLSTM trained on InceptionV3 of frames of the entire video. The BiLSTM model is used for every segment with and the contextual information of the video is used to obtain its relevance score between 0 and 1 for each frame.

Similarity to sentences in a group (vseScore): the platform uses the visual semantic embedding (VSE++) model to project this frame and corresponding group of sentences into a common multimodal embedding space and calculate similarity between these two vectors, to get the frames similarity to the audio transcripts of the segment.

At 704, the platform uses a weighted average of the three scores to arrive at the importance score for each frame, Importance Score=α*(prefScore)+β*(relScore)+γ*(vseScore),α,β,γ∈[0,1];α+β+γ=1

The frame with the maximum score is designated as the representative frame for the multimodal segment, and the importance score ensures that this selection is semantically aligned to the video while also aligned to the preferences of the target user. To reduce the group of sentences, at 706, the system uses BERT based summarization on the group of sentences to pick the most relevant sentence for the multimodal fragment. At 708, the platform extracts a key sentence as the text for a multimodal fragment. At 710, the multimodal fragments complete.

Personalized Ordering Module

In FIG. 4C, the personalized ordering module 408 orders the multimodal fragments output by multimodal fragment generation module 406 based on preferences of a target user, for nonlinear playback of underlying video segments. The personalized module 408 can also rank the multimodal fragments to optimize for relevance, alignment to user preferences, while optimizing coherence. Given a set of multimodal fragments that cover an entire video, a user might have a limit to the number of fragments that the user can consume. To address this concern, the personalized ordering module 408 can reduce a number of multimodal fragments for the user to only present the top relevant multimodal fragments. The ranking can account for multiple factors such as relevance to video, alignment to user interests, complete coverage of the information over the video while also maintaining coherence when consumed in that manner.

In an example, an information-theoretic framework can simultaneously optimize across these factors. An information factor is maximized to achieve the ranked ordering. The information factor accounts for the importance of a multimodal fragment for consumption experience and maximizing it to yield the optimal consumption order.

The information factor contains four components or a combination thereof. A first information factor is a similarity to user preferences. This is obtained with the average cosine similarities between each frame sentiment embedding and the user preference vector:

$$prefSim(S) = \frac{1}{|S|}\sum_{s} SentScore(s)$$

A second information factor is a relevance to video context. This factor is similar to the relScore in 406, obtained with a simple average over all the context similarity scores of all frames in the set, obtained using the BiLSTM:

$$setRel(S) = \frac{1}{|S|}\sum_{s \in S} RelScore(s)$$

A third information factor is a diversity of set. This factor uses the metric of dispersion, coefficient of variation (CV), to compute information diversity of a selected set of multimodal fragments. Maximizing diversity ensures that the multimodal fragments encompass diverse information from the video, thus implicitly achieving good coverage across the video. InceptionV3 features are taken for each frame and the CV is calculated across each dimension of the feature vector. Then these values are averaged over all dimensions to get a scalar representation of dispersion or diversity of a set:

$$Coeff.\ Variation(X) = \frac{std(X)}{|mean(X)|}$$

$S$ = Set of Inception $V3$ features of frames of $F$, $S^i$ = Set of $i^{th}$ dimension values of features in $S$ $$Diversity(S) = \frac{1}{D}\sum_{i=1}^{D} Coeff.\ Variation(S^i)$$

A fourth information factor includes sentence coherence. The system can use a BERTs NextSentencePrediction Model to get a score of sentence coherence. Given sentences $s_1$ and $s_2$, the model can predict $P(s_1$ before $s_2)$. Given a set of fragments of interest, $s_1$ is taken to be the most recently added sentence and $s_2$ are all candidate sentences to be added to this set:

$S_{-1}$=Last sentence of set $S$, $S_{-2}$=Second Last sentence of $S$

Coherence($S$)=$P(S_{-2}$ comes before $S_{-1})$

Given these four components, information of a set can be the weighted average of these factors.

Information($S$)=α*SetSim($S$)+β*SetRel($S$)+γ*Diversity($S$)+δ*Coherence($S$)

α+β+γ+δ=1;α,β,γ,δ∈[0,1]

The video platform can iteratively loop through the set of multimodal fragments and, on each iteration, add the multimodal fragment that maximizes information to the current set. The video platform continues this process until all the multimodal fragments are exhausted or hit an upper limit of fragments needed in the final reordered set.

Figure 8A:
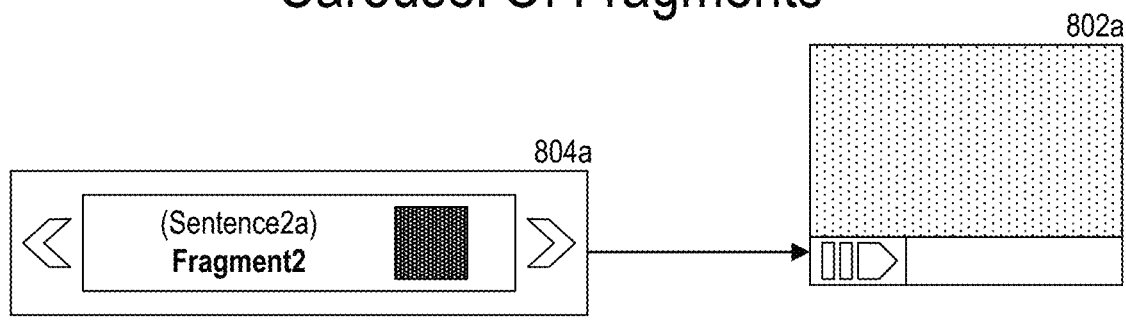
FIGS. 8A and 8B are block diagrams that depict different forms of experiencing nonlinear consumption of a video by a target user.
Figure 8B:
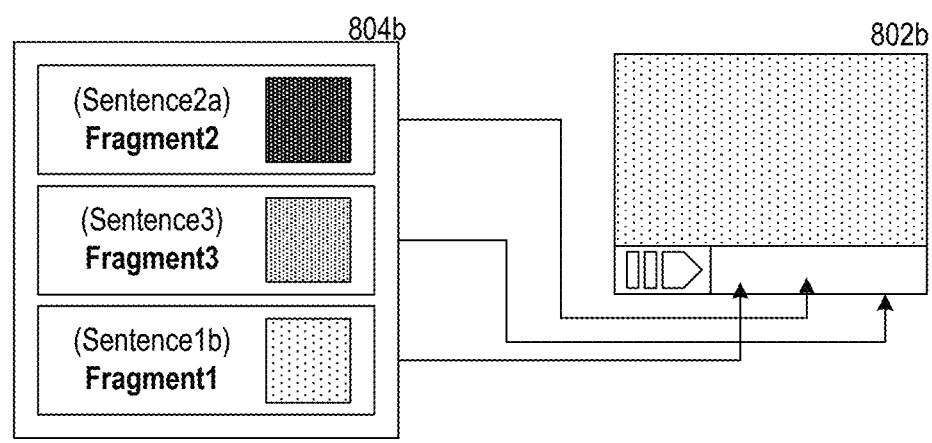

In one example, an information-gain based scorer is used to select and re/order a subset of multimodal fragments based on a user's consuming capacity and interests. The information score accounts for relevance to video context, similarity to a sentence group and alignment to user preferences, and selects a subset of fragments, in their order of relevance and importance to the user, to provide a nonlinear way of consuming the video. As a result, the target user can experience nonlinear consumption of the video FIGS. 8A and 8B are block diagrams that depict different forms of experiencing nonlinear consumption of a video by a target user. Specifically, in FIG. 8A, the video segments of the video are presented on a display 802a in accordance with multimodal fragments 804a that are presented as a carousel of fragments 804a. In contrast, in FIG. 8B, the video segments of the video are presented on display 802b in accordance with multimodal fragments 804b that are presented as a table of contents.

Figure 9:
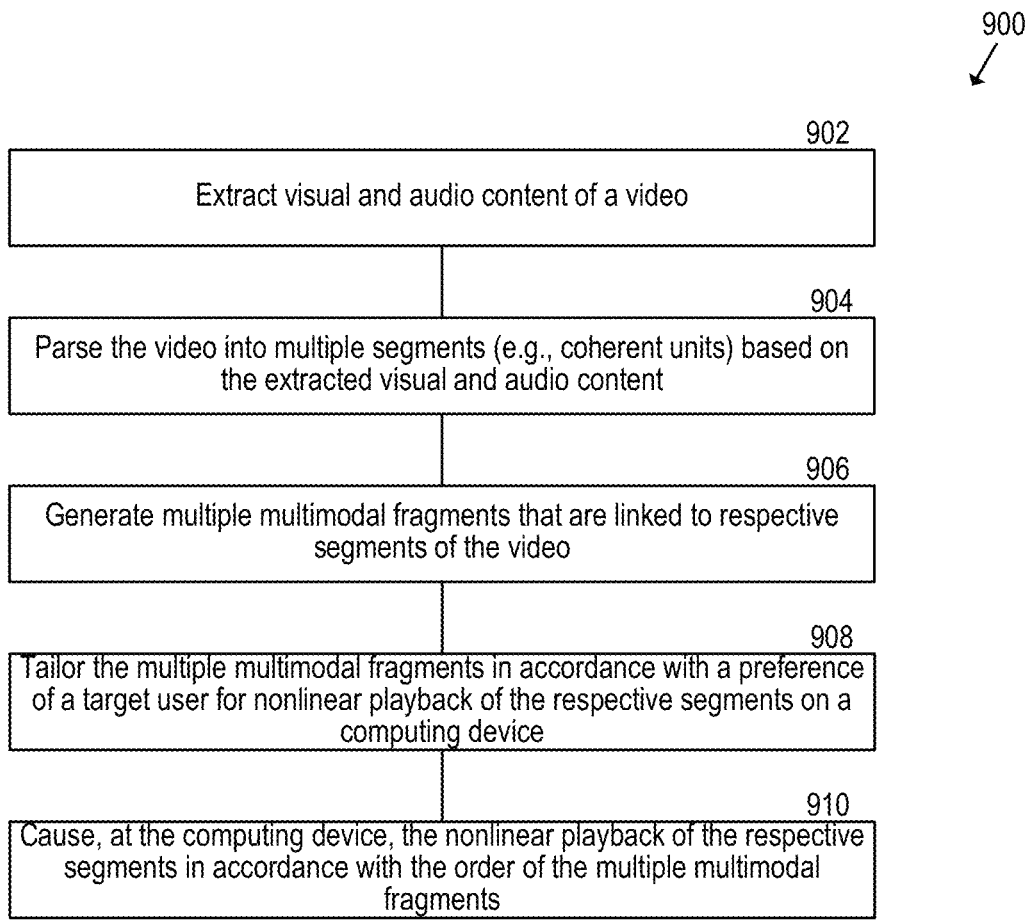
FIG. 9 is a flowchart that illustrates a process to generate multimodal fragments for nonlinear playback relative to a timeline of a video.

FIG. 9 is a flowchart that illustrates a process 900 to generate multimodal fragments for nonlinear playback relative to a timeline of a video. A video platform (e.g., video platform 302) can perform the process 900. For example, the video platform can host a video sharing website through which a video is uploaded and posted to the video platform. A user operating a computing device (e.g., smartphone) can access the video on the video platform through the video sharing website and set preferences for playback. For example, the user can indicate a persona type such as adventurous or compassionate. The video platform can receive an indication of the persona type as selected by the user on the computing device from among multiple persona types. The video platform then processes the video to provide personalized playback on the computing device based on the preferences for playback.

At 902, a content extraction module of the video platform extracts visual and audio content of the video. For example, the content extraction module extracts a color histogram of every frame in the video to detect a video shot. This process is used to obtain a set of video shots of the video. Regarding textual information, audio transcripts are extracted from the video by using automatic speech recognition to break the audio transcript into sentences along with identifying the start/end times of the sentences.

At 904, a video segmentation module of the video platform parses the video into multiple segments based on the extracted visual and audio content. For example, the video segmentation module marks a first frame of the video based on a difference between color histograms of the first frame and an adjacent second frame. The video segmentation module identifies a set of related frames relative to the first frame and the second frame and selects a median frame from the set of frames as a keyframe. The extracted audio transcripts of sentences are also grouped based on their semantic similarity. The video is then segmented based on the related frames and semantic similarities of related sentences.

At 906, a multimodal fragment generation module of the video platform generates (e.g., creates) multiple multimodal fragments that are linked to respective underlying segments of the video, where each multimodal fragment includes a visual component and a textual component that represents a linked segment. In one example, the video platform generates the visual component and/or the textual component of a multimodal fragment in accordance with the preference of the target user.

In another example, the video platform selects a representative frame of the video by using a semantic importance scoring system that accounts for relevance of a frame relative to the video and an alignment to the preference of the target user, where the visual component includes the representative frame of the multimodal fragment. The video platform selects a representative text from a group of sentences extracted from an audio transcript of the video, where the textual component includes the representative text.

At 908, a fragment ordering module of the video platform tailors (e.g., orders) the multimodal fragments in accordance with a preference of a target user for nonlinear playback of the respective segments on a computing device. In addition, the video platform can rank the multimodal fragments in accordance with the preference of the target user. For example, in one embodiment, the video platform will select only the top ranked multimodal fragments that exceed a threshold number to include for nonlinear playback of the segmented video. The video platform can then arrange the multimodal fragments in an index, where the index maps each multimodal fragment to a respective segment of the video. In one example, the multimodal fragments are selected based on relevance to context of the video and an alignment to the preference of the target user.

At 910, the video platform causes, at the computing device, the nonlinear playback of the respective segments in accordance with the order of the multimodal fragments. In one example, the video platform can cause the computing device to present the multimodal fragments in a carousel format for the nonlinear playback, or as a table of contents format for the nonlinear playback.

The disclosed solution thus offers several advantages over other solutions. One advantage is the ability to create a personalized consumption experience based on a non-personalized input video. In general, this is achieved by extracting key features from the input content and tuning output to user preferences by creating multimodal fragments indicative of the extracted features in the content. Another advantage is the ability to generate a nonlinear consumption experience based on the multimodal fragments. This is also achieved by tuning playback to user preferences, while maintaining coherence and integrity of the experience.

An evaluation of the video platform includes a process that manually curates thousands of videos from YouTube®, varying across categories, which can be broadly divided into entertainment, lectures, tutorials, and duration (e.g., short (<5 mins), medium (>5 and <15 mins), and long (>15 mins)). The video platform can use publicly available video datasets, which contain advertisement videos of length mostly less than 5 mins.

An evaluation of the video platform is by comparison to baselines that represent works closely related to the present technique, including:

Generating multimodal fragments using video summarization, which refers to summarizing a video by using a subset of coherent segments from the video. A video summary should capture key information from the video and does not account for aspects like navigation, personalization, reordering which are pertinent to the disclosed solution. A process that includes finding keyframes for segments of videos, extracting an audio transcript, identifying the related video segment and assigning the audio transcript to a summarized fragment. The keyframe and the assigned transcript constitute a multimodal fragment in the video summary. This provides a sequence of multimodal fragments with keyframes corresponding to segments in a video summary and text of the segment from the video.

Generating multimodal fragments using audio-visual captioning, which exploits both visual and audio signals of a video to generate captions for keyframes in the video. The provides frame-level captions that are not necessarily comprehensive and aware of the overall theme in a video. The process involves obtaining frame-level captions for a video. Many frames may have the same caption because an action can span multiple frames and only one caption would suffice for the whole duration. As such, a frame (along with its captions) that is most representative of the duration in which the caption spans is selected. The selected frame and caption are multimodal fragment and are sequenced in the same order as in the video to arrive at the final sequence of multimodal fragments.

Generating multimodal fragments using visual storytelling, which refers to generating multiple coherent sentences for a given sequence of images. The sequence of images may or may not belong to a video but are required to have a storyline to them so that the generated sentence can convey a story. This technique adapts the visual storytelling method by finding the most representative 5 frames from the video by sorting based on an important score (see, e.g., block 306). The 5 frames are passed on to a pre-trained model as input (in the same order as they occurred in the video) to generate 5 corresponding sequential texts that make a larger story (aligned to the story represented by the sequence of frames). The image and text pairs are used as final multimodal fragments. The constraint on a number of images in a sequence to 5 is due to the pre-trained model.

A platform can also randomly sample frames from segments. The randomly sampled frames are accompanied by text from the transcript at a given timestamp. This provides a naïve baseline to compare the methods against. All the aforementioned baselines work as competitive and relevant adaptations of existing approaches to solve the problem at hand, while the random sampling acts as the lowest performance bar for comparison.

A set of standard metrics capture different aspects of the proposed solution. The metrics cover a range of aspects including:

Image-video relevance metric: a measure of how close a selected frame is to context of a video. The technique takes the average of all ResNet-152 embeddings of keyframes from a video and considers it as the video representation. The platform then takes the average similarity of the representations of images in final multimodal fragments with video representation to quantify image-video relevance. A cosine similarity function is used for computing similarity between vector embeddings.

Image diversity metric: a measure of diversity among a set of selected frames in the final multimodal fragments. To quantify diversity among selected images in the final multimodal fragments, the platform computes the average pair-wise similarity of all the images by using ResNet-152 as image representations and then subtract it from 1. That is, $$1 - \frac{1}{N(N-1)} \sum sim(image_i, image_j).$$

The similarity function sim(·) is the cosine similarity between RESNET-152 embeddings for images.

Text-transcript similarity metric: measure of how similar the output text is to the transcript of a video. This is done by first computing the document representation by averaging the sentence-level BERT embeddings and then computing its average similarity with the text corresponding to every multimodal fragment. Similarity is computed using cosine similarity between vectors.

Text diversity: measures diversity among a set of output sentences. Similar to computing diversity in images, to measure diversity of text in multimodal fragments, the platform computes pairwise similarity of text in the final multimodal fragments and subtracts it from 1, to convert similarity metric into a distance computation. Mathematically, $$1 - \frac{1}{N(N-1)} \sum sim(text_i, text_j).$$

The similarity function sim(·) is the cosine similarity between vectors for text, which are obtained using BERT embeddings.

Text coherence metric: measures consistency in semantics of output sentences. As noted before, in a sequence of multimodal fragments, coherence of the sequence of text can be computed using BERT-based sentence sequence modeling; Coherence(S)=P ($S_1$ comes before $S_2$) gives the coherence between two adjacent text pieces, and the average across all such values gives the overall text coherence.

Image-text relevance metric: measures the similarity between the output frame and its corresponding sentence. To ensure that the text and its corresponding image in a fragment are related to each other, the system computes the fragment-wise similarity between image representation and the text representation using VSE++ embeddings (they bring both representations to a common space). The average of these image-text similarities taken across all the fragments in the final multimodal fragments measures the relevance between images and text in the multimodal fragments. The similarity is computed using cosine similarity between the vectors.

Video coverage metric: measures extent to which video content is covered by multimodal fragments. With an aim to quantify what portion of the original video is covered by the final multimodal fragments, the platform computes the fraction of segments (see, e.g., block 404) that are included in the fragment. Mathematically, $$Coverage = \frac{\text{number of segments covered in final fragments}}{\text{total number of segments in the video}}$$

User alignment metric: measures how well output fragments resonate with user persona. This is computed by taking a cosine similarity between user persona (onehot representation with respect to the sentiments under consideration) and the average sentiment vector for all the images in final multimodal fragments.

Table 1 shows that the video platform performs better in choosing a diverse set of images compared to other techniques, which are contextually important to the video. Also, the video platform is better aligned to user persona than other baselines and covers video content to a larger extent. Of the other metrics, the platform is sufficiently close to the best baselines. On some dimensions, the performance is identical to a few baselines. This is because the platform shares parts of the pipeline with the other baseline approaches. For example, the audio-visual captioning baseline uses the image selection and generates text, thus yielding similar numbers on the image related metrics.

TABLE 1

Performance Comparison on a Collection of Videos - Across Various Lengths and Categories

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.10 | 0.45 | 0.55 | 0.36 | 0.79 | 0.14 | 0.84 | 0.12 |
| Audio-Visual Captioning | 0.10 | 0.45 | 0.17 | 0.24 | 0.88 | 0.20 | 0.84 | 0.12 |
| Visual Story-Telling | 0.07 | 0.42 | 0.32 | 0.41 | 0.79 | 0.19 | 0.65 | 0.08 |
| Video Summarization | 0.06 | 0.44 | 0.59 | 0.25 | 0.74 | 0.11 | 0.28 | 0.10 |
| Random Sampling | 0.07 | 0.43 | 0.55 | 0.31 | 0.69 | 0.12 | 0.34 | 0.11 |

In Tables 2 through 7, the video platform is evaluated on different facets of video duration and categories.

TABLE 2

Performance Comparison on a Collection of Short Videos (<5 min) - Across Various Categories

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.08 | 0.42 | 0.57 | 0.34 | 0.76 | 0.14 | 0.93 | 0.10 |
| Audio-Visual Captioning | 0.08 | 0.42 | 0.16 | 0.23 | 0.86 | 0.20 | 0.93 | 0.10 |
| Visual Storytelling | 0.07 | 0.40 | 0.30 | 0.41 | 0.79 | 0.19 | 0.76 | 0.08 |
| Video Summarization | 0.04 | 0.42 | 0.61 | 0.21 | 0.72 | 0.11 | 0.29 | 0.07 |
| Random Sampling | 0.06 | 0.42 | 0.57 | 0.29 | 0.66 | 0.12 | 0.38 | 0.09 |

TABLE 3

Performance Comparison on a Collection of Medium Videos (>5 min and <15 min) - Across Various Categories

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.16 | 0.55 | 0.45 | 0.47 | 0.94 | 0.14 | 0.51 | 0.22 |
| Audio-Visual Captioning | 0.16 | 0.55 | 0.20 | 0.30 | 0.96 | 0.19 | 0.51 | 0.21 |
| Visual Storytelling | 0.06 | 0.48 | 0.39 | 0.41 | 0.79 | 0.19 | 0.22 | 0.08 |
| Video Summarization | 0.11 | 0.51 | 0.49 | 0.39 | 0.81 | 0.11 | 0.26 | 0.20 |
| Random Sampling | 0.10 | 0.48 | 0.45 | 0.41 | 0.78 | 0.11 | 0.19 | 0.20 |

TABLE 4

Performance Comparison on a Collection of Long Videos (>15 min) - Across Various Categories

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.19 | 0.60 | 0.57 | 0.32 | 0.90 | 0.12 | 0.17 | 0.26 |
| Audio-Visual Captioning | 0.19 | 0.60 | 0.16 | 0.31 | 0.91 | 0.18 | 0.17 | 0.26 |

TABLE 4-continued

Performance Comparison on a Collection of Long Videos (>15 min) - Across Various Categories

| Baseline | Image-video relevance | Image diversity | Text-transcript similarity | Text diversity | Text coherence | Image-text relevance | Video coverage | User Alignment |
|---|---|---|---|---|---|---|---|---|
| Visual Storytelling | 0.08 | 0.54 | 0.35 | 0.41 | 0.77 | 0.19 | 0.10 | 0.09 |
| Video Summarization | 0.12 | 0.50 | 0.57 | 0.26 | 0.74 | 0.13 | 0.22 | 0.23 |
| Random Sampling | 0.09 | 0.56 | 0.57 | 0.31 | 0.76 | 0.11 | 0.08 | 0.21 |

Based on Tables 2 through 4, the results follow the general trend of Table 1, indicating an advantage of the proposed approach. One also observes improvement in text coherence scores for medium and long videos.

Lastly, as shown in Tables 5 through 7, the results follow the overall trend, indicating the feasibility of the proposed approach. Specifically, note that on tutorials (a common video format in Behance), the video platform performs the best on all metrics except image-text relevance, perhaps because of the nature of tutorial videos where visual medium is used for illustration purposes.

TABLE 5

Performance Comparison on a Collection of Entertainment Videos - Across Various Lengths

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.08 | 0.42 | 0.60 | 0.30 | 0.74 | 0.14 | 0.92 | 0.10 |
| Audio-Visual Captioning | 0.08 | 0.42 | 0.15 | 0.23 | 0.85 | 0.20 | 0.92 | 0.10 |
| Visual Storytelling | 0.07 | 0.40 | 0.29 | 0.41 | 0.78 | 0.19 | 0.78 | 0.08 |
| Video Summarization | 0.04 | 0.43 | 0.66 | 0.19 | 0.72 | 0.11 | 0.30 | 0.07 |
| Random Sampling | 0.06 | 0.41 | 0.59 | 0.26 | 0.66 | 0.13 | 0.38 | 0.09 |

TABLE 6

Performance Comparison on a Collection of Lecture Videos - Across Various Lengths

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.14 | 0.50 | 0.40 | 0.51 | 0.94 | 0.13 | 0.66 | 0.18 |
| Audio-Visual Captioning | 0.14 | 0.50 | 0.17 | 0.28 | 0.98 | 0.22 | 0.66 | 0.18 |
| Visual Storytelling | 0.06 | 0.44 | 0.39 | 0.40 | 0.80 | 0.21 | 0.33 | 0.08 |
| Video Summarization | 0.09 | 0.44 | 0.43 | 0.41 | 0.77 | 0.11 | 0.23 | 0.16 |
| Random Sampling | 0.09 | 0.46 | 0.41 | 0.45 | 0.75 | 0.11 | 0.20 | 0.18 |

TABLE 7

Performance Comparison on a Collection of Tutorial Videos - Across Various Lengths

| Baseline | Image-video relevance | Image diversity | Text-transcript similarity | Text diversity | Text coherence | Image-text relevance | Video coverage | User Alignment |
|---|---|---|---|---|---|---|---|---|
| Video Platform | 0.17 | 0.57 | 0.47 | 0.48 | 0.94 | 0.14 | 0.58 | 0.21 |
| Audio-Visual Captioning | 0.17 | 0.57 | 0.26 | 0.32 | 0.94 | 0.19 | 0.58 | 0.21 |
| Visual Storytelling | 0.07 | 0.50 | 0.37 | 0.41 | 0.81 | 0.18 | 0.27 | 0.08 |
| Video Summarization | 0.10 | 0.48 | 0.40 | 0.38 | 0.78 | 0.11 | 0.27 | 0.18 |
| Random Sampling | 0.11 | 0.52 | 0.45 | 0.44 | 0.79 | 0.11 | 0.25 | 0.19 |

Computing System

Figure 10:
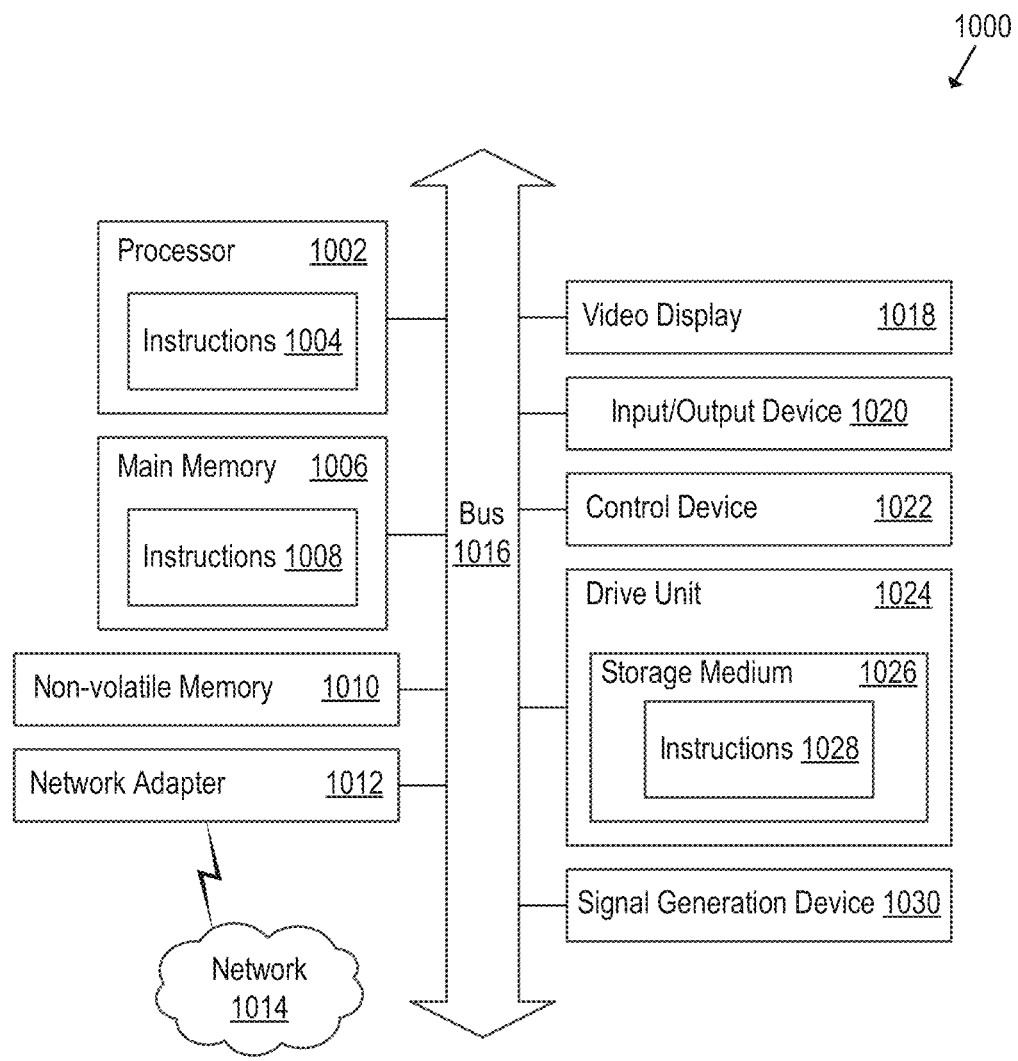
FIG. 10 is a block diagram that illustrates an example of a computing system in which at least some operations described herein can be implemented.

FIG. 10 is a block diagram illustrating an example of a computing system 1000 in which at least some operations described herein can be implemented. For example, some components of the computing system 1000 may be hosted on a computing device that includes a video platform (e.g., the video platform 302 of FIG. 3).

The computing system 1000 may include one or more central processing units (also referred to as "processors") 1002, main memory 1006, non-volatile memory 1010, network adapter 1012 (e.g., network interface), video display 1018, input/output devices 1020, control device 1022 (e.g., keyboard and pointing devices), drive unit 1024 including a non-transitory computer-readable storage medium 1026, and signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1094 bus (also referred to as "Firewire").

The computing system 1000 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the computing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computing device. When read and executed by the one or more processors 1002, the instruction(s) cause the computing system 1000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1012 enables the computing system 1000 to mediate data in a network 1014 with an entity that is external to the computing system 1000 through any communication protocol supported by the computing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:
1. A computer-implemented method comprising:
extracting visual and audio content of a target video;
parsing the target video into segments based on the extracted visual and audio content;

generating, utilizing a trained sentiment classifier machine learning model to analyze visual embeddings of individual frames to predict a visual sentiment of each individual frame, frame sentiment embeddings for frames of the target video and a sentiment distribution for one or more videos previously viewed by a user of a computing device;

generating a user preference vector based on the sentiment distribution for the one or more videos previously viewed by the user;

generating, by a multimodal fragment generation model, multimodal fragments corresponding to the segments of the target video, wherein the multimodal fragments comprise visual components and textual components extracted from the segments;

generating, utilizing a trained context classifier machine learning model to analyze the frames of the target video, a video-level context embedding of contextual information for the target video and segment-level context embeddings of contextual information for the segments of the target video;

determining a nonlinear ordering of the multimodal fragments by comparing the user preference vector with sets of frame sentiment embeddings for frames of the target video corresponding to the multimodal fragments and comparing the video-level context embedding with the segment-level context embeddings corresponding to the multimodal fragments; and causing, at the computing device, playback of the segments in accordance with the nonlinear ordering of the multimodal fragments.

2. The computer-implemented method of claim 1, wherein generating the multimodal fragments comprises generating, utilizing a pretrained embedding model, a textual component of a multimodal fragment of the multimodal fragments based on comparing, in an embedding space, embedded sentences from a segment of the segments corresponding to the multimodal fragment.

3. The computer-implemented method of claim 1, wherein generating the multimodal fragments comprises generating the visual components of the multimodal fragments by:
comparing the user preference vector with the frame sentiment embeddings for frames of the segments corresponding to the multimodal fragments to determine user preference scores for the frames of each segment; and
selecting a representative frame as a visual component for a multimodal fragment corresponding to each segment based on the user preference scores.

4. The computer-implemented method of claim 1, wherein determining the nonlinear ordering of the multimodal fragments comprises:
determining a ranking of the multimodal fragments based on comparing the user preference vector with the sets of frame sentiment embeddings corresponding to the multimodal fragments and comparing the video-level context embedding with the segment-level context embeddings corresponding to the multimodal fragments; and
selecting and ordering the multimodal fragments based on the ranking.

5. The computer-implemented method of claim 1, wherein generating the user preference vector further comprises:

generating, utilizing the trained sentiment classifier machine learning model, frame sentiment embeddings for frames of the one or more videos previously viewed by the user; and determining the sentiment distribution indicated by the frame sentiment embeddings for frames of the one or more videos.

6. The computer-implemented method of claim 1, wherein generating the multimodal fragments further comprises:
determining importance scores for frames of a segment, each importance score comprising one or more of:
a user preference score based on comparing the user preference vector with frame sentiment embeddings for the frames of the segment,
a video context relevance score based on comparing the video-level context embedding with frame-level context embeddings of contextual information for the frames of the segment, or
a sentence similarity score based on comparing, within a multimodal embedding space, embedded sentences corresponding to the frames of the segment with visual semantic embeddings of the frames of the segment; and
selecting a frame from the frames of the segment as a visual component for a multimodal fragment corresponding to the segment by comparing the importance scores of the frames.

7. The computer-implemented method of claim 1, wherein determining the nonlinear ordering of the multimodal fragments further comprises:
determining information factors for the segments corresponding to the multimodal fragments, each information factor comprising one or more of:
a user preference factor based on similarities between the user preference vector and frame sentiment embeddings for frames of a segment,
a video context relevance factor based on similarities between a segment-level context embedding of the segment and the video-level context embedding, or
an information diversity factor based on differences between the segment-level context embedding of the segment and a diversity distribution of segment-level context embeddings of segments of the target video; and
ordering the multimodal fragments based on the information factors of the corresponding segments.

8. The computer-implemented method of claim 1, wherein determining the nonlinear ordering of the multimodal fragments further comprises:
determining, based on comparing the user preference vector with sets of frame sentiment embeddings for frames of the target video corresponding to the multimodal fragments, user preference scores for the multimodal fragments;
determining, based on comparing the video-level context embedding with the segment-level context embeddings corresponding to the multimodal fragments, video context scores for the multimodal fragments;
determining, utilizing a trained sentence prediction machine learning model to predict a likelihood that a first input sentence precedes a second input sentence, sentence coherence scores for subsequent sentences of the segments corresponding to the multimodal fragments; and iteratively reordering the multimodal fragments based on the user preference scores, the video context scores, and the sentence coherence scores.

9. The computer-implemented method of claim 1, wherein parsing the target video into segments further comprises:
   determining groups of sentences of an audio transcript of the target video based on cosine similarities between embedded sentences from the groups of sentences; and
   partitioning the target video based on the groups of sentences.

10. The computer-implemented method of claim 1, wherein parsing the target video into segments comprises:
    identifying, based on differences between color histograms of consecutive frames of the target video, a set of related frames corresponding to a video shot; and
    selecting a median frame from the set of related frames as a keyframe for the video shot.

11. The computer-implemented method of claim 1, wherein parsing the target video into the segments further comprises:
    extracting audio transcripts from the target video;
    generating embedded sentences by utilizing a pretrained embedding model to encode sentences of the audio transcripts into an embedding space; and
    parsing the audio transcripts into groups of sentences based on semantic similarities between the embedded sentences.

12. The computer-implemented method of claim 1, wherein generating multimodal fragments comprises:
    selecting a representative frame based on a semantic importance score for a frame-level context embedding of each frame of a segment of the segments relative to the video-level context embedding of the target video and a comparison of a set of the sets of frame sentiment embeddings corresponding to the segment with the user preference vector, wherein a visual component for a multimodal fragment corresponding to the segment includes the representative frame; and
    selecting a representative text from a group of sentences extracted from an audio transcript of the target video, wherein a textual component for the multimodal fragment corresponding to the segment includes the representative text.

13. A non-transitory computer-readable medium with instructions stored thereon that, when executed by at least one processor, cause the at least one processor to perform operations comprising:
    partitioning a target video into segments comprising visual and audio content;
    generating, utilizing a trained sentiment classifier machine learning model to analyze visual embeddings of individual frames to predict a visual sentiment of each individual frame, frame sentiment embeddings for frames of the target video and a sentiment distribution for frames of one or more videos previously viewed by a target user;
    generating a user preference vector based on the sentiment distribution for the one or more videos previously viewed by the target user;
    generating, based on comparing sets of the frame sentiment embeddings for the frames of the target video with the user preference vector, the sets of the frame sentiment embeddings corresponding to the segments of the target video, multimodal fragments comprising image-text pairs that represent the segments of the target video; and
    determining an ordering of the multimodal fragments for segmented playback of the target video.

14. The non-transitory computer-readable medium of claim 13, wherein the operations further comprise:
    generating a ranking for the multimodal fragments by comparing the sets of the frame sentiment embeddings corresponding to the segments of the target video represented by the multimodal fragments with the user preference vector; and
    ordering of the multimodal fragments based on the ranking.

15. The non-transitory computer-readable medium of claim 13, wherein the operations further comprise causing, at a computing device, the segmented playback of the segments of the target video in accordance with the ordering for the multimodal fragments.

16. The non-transitory computer-readable medium of claim 13, wherein the operations further comprise:
    generating, utilizing a trained context classifier machine learning model to analyze the frames of the target video, a video-level context embedding of contextual information for the target video and frame-level context embeddings of contextual information for the frames of the target video; and
    generating the multimodal fragments based on comparing the sets of the frame sentiment embeddings for the frames of the target video with the user preference vector and comparing sets of the frame-level context embeddings with the video-level context embedding, the sets of the frame-level context embeddings corresponding to the segments of the target video.

17. The non-transitory computer-readable medium of claim 13, wherein the operations further comprise:
    generating, utilizing a trained context classifier machine learning model to analyze the frames of the target video, a video-level context embedding of contextual information for the target video and segment-level context embeddings of contextual information for the segments of the target video; and
    determining the ordering of the multimodal fragments by comparing the user preference vector with the sets of the frame sentiment embeddings corresponding to the multimodal fragments and comparing the video-level context embedding with the segment-level context embeddings corresponding to the multimodal fragments.

18. A system comprising:
    one or more memory devices; and
    one or more processors coupled to the one or more memory devices that cause the system to perform operations comprising:
    generating segments of a target video based on visual and audio content of the target video;
    generating, utilizing a trained sentiment classifier machine learning model to analyze visual embeddings of individual frames to predict a visual sentiment of each individual frame, frame sentiment embeddings for frames of the target video and a sentiment distribution for one or more videos previously viewed by a target user;
    generating a user preference vector based on the sentiment distribution for the one or more videos previously viewed by the target user;
    generating multimodal fragments for the segments of the target video by comparing sets of the frame sentiment embeddings for the frames of the target video with the user preference vector, the sets of the frame sentiment embeddings corresponding to the segments of the target video, wherein each multimodal fragment corresponds to a respective segment of the target video and includes a visual component and a textual component representing the respective segment; and determining a personalized ordering of the multimodal fragments for segmented playback of the target video by comparing the sets of the frame sentiment embeddings corresponding to the multimodal fragments with the user preference vector.

19. The system of claim 18, wherein generating the user preference vector further comprises:

generating, utilizing the trained sentiment classifier machine learning model, frame sentiment embeddings for frames of the one or more videos previously viewed by the target user; and determining the sentiment distribution indicated by the frame sentiment embeddings for frames of the one or more videos.

20. The system of claim 18, wherein the operations further comprise:

generating, utilizing a trained context classifier machine learning model to analyze the frames of the target video, a video-level context embedding of contextual information for the target video and segment-level context embeddings of contextual information for the segments of the target video; and determining the personalized ordering of the multimodal fragments for segmented playback of the target video by comparing the sets of the frame sentiment embeddings corresponding to the multimodal fragments with the user preference vector and comparing the video-level context embedding with the segment-level context embeddings corresponding to the multimodal fragments.

* * * * *